Figure 1:
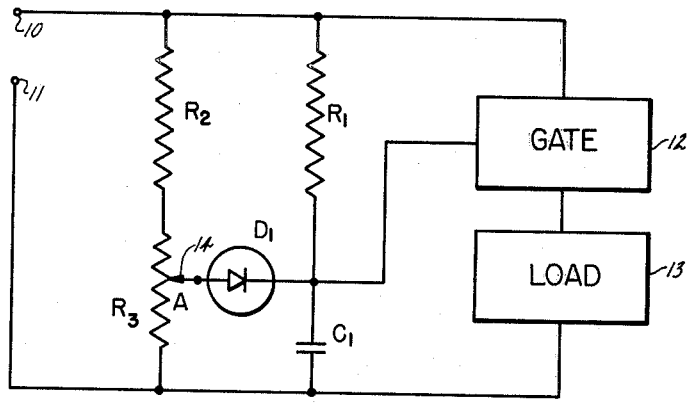

Nov. 24, 1964   J. A. GARRATT   3,158,790
TIMING CIRCUIT
Filed Oct. 31, 1961

INVENTOR.
JOSEPH A. GARRATT
BY *Lindsey Prutzman, and Hayes*
ATTORNEYS

United States Patent Office 3,158,790
Patented Nov. 24, 1964

3,158,790
TIMING CIRCUIT
Joseph A. Garratt, Simsbury, Conn., assignor to HI-G Incorporated, Windsor Locks, Conn., a corporation of Connecticut
Filed Oct. 31, 1961, Ser. No. 149,028
5 Claims. (Cl. 317—142)

This invention relates to a circuit for providing an accurately regulatable variable time delay and more particularly to such a circuit in which the time constant of an RC circuit is employed to achieve such a delay.

In present-day electronic circuitry it is often necessary that relays be employed which are capable of operating a determinable and variable time after the change of a particular electrical condition. For example, it may be required that a relay operate a variable predetermined unit of time after the application of the driving current thereto. Toward this end the use of the charging characteristic of a condenser having a resistive charging path offers a convenient means to achieve the desired result. The present invention finds particular utility in providing for the time-delayed operation of a load device such as a relay, which load device may be remotely located from the time delay circuitry and has for a principal object the provision of an improved circuit capable of providing a broad range of accurately predeterminable time delays for a relay-type load while, at the same time, providing chatter-free contact operation under conditions of severe shock and vibration and maintaining close timing tolerances over broad ranges of temperature and voltage variation.

It is a further object of the present invention to provide a circuit for providing an accurately regulatable variable time delay for use in connection with load devices which are required to be operated a predetermined and variable time delay after the application of a particular parameter to the time delay circuit.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 2:
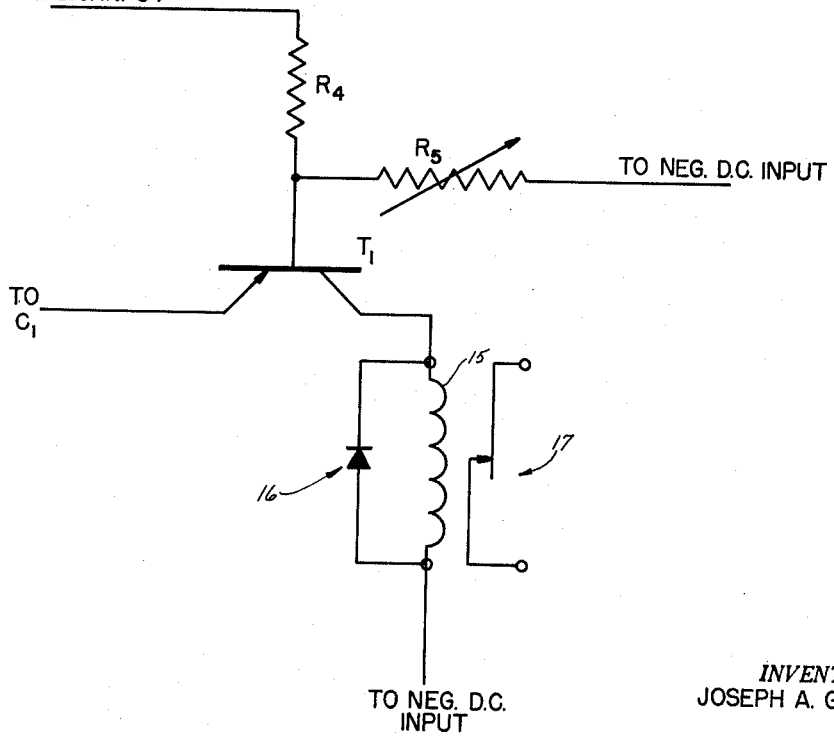

In the drawings:

FIG. 1 is a circuit diagram, partly diagrammatic, showing a basic embodiment of the present invention; and FIG. 2 is a circuit diagram showing one form of gate which may be employed in connection with the present invention and one form of load that may be so employed.

Turning to FIGS. 1 and 2, a D.C. input is provided to terminals 10 and 11 and may, for instance, be of value of +125 volts D.C. plus or minus 5 volts. This D.C. input voltage is applied in parallel across a first network consisting of resistor $R_2$ and potentiometer $R_3$ and a second network consisting of resistor $R_1$ and condenser $C_1$. The resistors are so selected that $R_2$ and $R_3$ are relatively small with relation to $R_1$. A gate 12 monitors the charging voltage of the condenser $C_1$ and the output of the gate is connected to actuate the load 13. In the initial portion of the charge cycle of condenser $C_1$, substantially all of the charging current therefor flows through $R_2$, a portion of the potentiometer $R_3$ determined by the setting of the movable tap 14 and the forward biased diode $D_1$ to the condenser $C_1$. Ultimately during the charge cycle of the condenser $C_1$, the voltage thereacross will reverse bias the diode $D_1$ and then the charge path of the condenser $C_1$ will include only the resistor $R_1$. The voltage across $C_1$ will ultimately reach a particular potential which, depending upon the characteristics of gate 12, will turn said gate "on" to actuate load 13.

It can be seen then that the timing adjustment circuit which includes resistor $R_2$, potentiometer $R_3$ and the diode $D_1$ is actively in the charge path of the condenser $C_1$ only during an initial portion of the charge cycle thereof. Upon attainment of a voltage across $C_1$ exceeding that voltage tapped off from potentiometer $R_3$, diode $D_1$ becomes reverse biased. Then the fixed resistor $R_1$ determines the charge rate of condenser $C_1$. During the initial portion of the charge cycle, the low resistance path including $R_2$, a portion of $R_3$ and the diode $D_1$ provides a lower resistance path for the charging current, thereby allowing condenser $C_1$ to charge rapidly to the voltage appearing at point A. Subsequently, condenser $C_1$ will be charged only through resistor $R_1$. The reverse biasing of the blocking diode $D_1$ removes the time adjustment circuit from circuit activity.

Timing adjustments for this circuit consist of setting the potentiometer $R_3$ to its most negative potential position and adjusting resistor $R_1$, by selection, until the maximum timing range is established. When potentiometer $R_3$ is set to its maximum positive potential position and $R_2$ is adjusted, by selection, to provide the minimum time value. The resistance value of potentiometer $R_3$ is not critical and should be selected to be compatible with the capabilities of the power supply circuit and $R_2$.

With reference particularly to FIG. 2, there is shown one form of gate that may be employed in connection with the present invention. The gate is shown in operating relation to a load in the form of a relay. Of course there may be other types of loads as well as a plurality of said relays. The emitter of transistor $T_1$ monitors the voltage across condenser $C_1$. To the base of transistor $T_1$ is applied a portion of the D.C. input voltage. This portion is determined by the values of resistor $R_4$ and variable resistor $R_5$ which may, for instance, be set so that a bias voltage equal to 63 percent of the applied D.C. input voltage is applied to the base of the transistor $T_1$. Other percentages may, of course, be chosen. Therefore, it can be seen that until the voltage across $C_1$ reaches approximately the value of the base potential, transistor $T_1$ is off. However, as soon as the emitter potential of $T_1$ exceeds the aforementioned bias potential so as to forward bias the emitter-base diode, then transistor $T_1$ turns on and supplies a driving current for the relay coil 15. Across the relay coil is a conventional diode 16 biased in the direction as shown. The relay contacts are shown diagrammatically as 17.

It should be noted that other forms of gates such as Shockley diodes, silicon-controlled rectifiers, unijunction transistors, etc. may be employed which are well understood to those skilled in the art. It is only necessary that this gate be in a condition whereby the load device is not energized until a particular switching potential is applied to the gate. In most instances the resistors $R_4$ and $R_5$ could be fixed at a particular percentage value of applied D.C. input and therefore provide a fixed bias to the gate 12. The time delay then could be achieved simply by the setting of potentiometer $R_3$.

It can be seen from the above that this invention provides circuit means for varying the time charging characteristics of the condenser for cooperative arrangement with a biased gate to thereby provide a variable time delay relay. In general this is achieved without variation of the basic RC network by employing a separate time adjustment network with variable resistance incorporated therein to provide a low impedance charge path for the condenser only during an initial portion of the charging cycle and to thereafter be isolated from the charging path for said condenser. Such a scheme eliminates the otherwise necessity of providing a variable resistance in a high impedance-high voltage charging path of the condenser with attendant difficulties in selection of a variable resistor of the type that will accurately function under these conditions. Again, it must be noted that a relay is used here as the load for illustration purposes only. Any other utilization circuit which requires a time delay after the application of a particular parameter may be substituted therefor.

While various embodiments of the present invention have been shown, other embodiments will be obvious to those skilled in the art and are contemplated to be within the spirit and scope of the following claims.

I claim:

1. A time delay circuit for actuating a load device comprising a first branch network including a first fixed resistance and a condenser series connected, said first fixed resistance constituting a first charging current path for said condenser, a second branch network including a resistive impedance, means connecting said first and second branch networks in parallel across a source of charging current, a uni-directional current conducting device connected between said resistive impedance and said condenser and poled to thereby form with said resistive impedance a second charging current path for said condenser, a gate monitoring the charging potential of said condenser, said gate being arranged to switch to an operative condition when said condenser reaches a predetermined voltage, a load device operatively connected to said gate to be actuated when said gate is operated, whereby said second charging current path for said condenser carries substantially all of the charging current therefor during the initial portion of the charge cycle, said initial portion being terminated when the voltage across said condenser reverse biases said device so that said first charging current path carries all of the charging current therefor subsequent to said initial portion of said charging cycle.

2. A time delay circuit as defined in claim 1 wherein the resistance of said resistive impedance is less than that of said fixed resistance.

3. A time delay circuit as claimed in claim 2 wherein said resistive impedance includes a second fixed resistance and a variable resistance potentiometer having a movable tap associated therewith, and means connecting said tap to said uni-directional current conducting device whereby the setting of said tap determines the time at which said predetermined voltage for switching said gate is reached.

4. A time delay circuit as claimed in claim 3 wherein said load device includes a relay.

5. A variable time delay circuit for actuating a load comprising a condenser, a first resistive charging current path for said condenser, a second resistive charging current path for said condenser having a variable resistance therein, means to charge said condenser through both said paths during an initial portion of said charge cycle, means to disconnect said second path after said initial portion, means determined by the attainment of a predetermined voltage across said condenser during the charging cycle therefor to actuate said load, and means to vary said variable resistance to vary the time of said voltage attainment and thereby the time of actuation of said load.

References Cited in the file of this patent
UNITED STATES PATENTS

| | | |
|---|---|---|
| 2,389,458 | Preston | Nov. 20, 1945 |
| 3,049,627 | Higginbotham | Aug. 14, 1962 |